(12) United States Patent
Hendrickson et al.

(10) Patent No.: US 8,593,526 B1
(45) Date of Patent: Nov. 26, 2013

(54) APPARATUS FOR MEASURING NOISE IN AN ANALOG SIGNAL

(75) Inventors: Alan Hendrickson, Rollingwood, TX (US); David Trager, San Marcos, TX (US); Zhongchun Liu, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 0 days.

(21) Appl. No.: 13/586,854

(22) Filed: Aug. 15, 2012

Related U.S. Application Data

(60) Provisional application No. 61/663,491, filed on Jun. 22, 2012.

(51) Int. Cl.
*H04N 17/02* (2006.01)
*H04N 5/08* (2006.01)

(52) U.S. Cl.
USPC .......................... 348/193; 348/533; 348/534

(58) Field of Classification Search
USPC .......... 348/180, 183, 192, 193, 533, 534, 607
See application file for complete search history.

(56) References Cited

U.S. PATENT DOCUMENTS

| | | | | |
|---|---|---|---|---|
| 3,302,116 A | * | 1/1967 | Free | 375/227 |
| 3,475,683 A | * | 10/1969 | Hulland | 324/140 R |
| 3,683,282 A | * | 8/1972 | Paolo D'Amato et al. | 348/193 |
| 3,737,781 A | * | 6/1973 | Deerkoski | 702/191 |
| 3,875,328 A | * | 4/1975 | Gibson et al. | 348/193 |
| 3,995,105 A | * | 11/1976 | Krivosheev et al. | 348/193 |
| 4,700,227 A | * | 10/1987 | Liebel et al. | 348/183 |
| 4,721,997 A | * | 1/1988 | Wittrock | 348/193 |

FOREIGN PATENT DOCUMENTS

| | | |
|---|---|---|
| EP | 1480331 | 11/2004 |
| EP | 1611741 | 1/2006 |
| EP | 2490435 | 8/2012 |

* cited by examiner

*Primary Examiner* — Victor Kostak
(74) *Attorney, Agent, or Firm* — Meyertons, Hood, Kivlin, Kowert & Goetzel, P.C.; Michael B. Davis

(57) ABSTRACT

Techniques are disclosed relating to video signal-to-noise ratio (VSNR) measurement. In one embodiment, an analog television signal receiver includes a measurement circuit configured to measure noise in a video signal over one or more intervals that correspond to a horizontal control signal of the video signal and a control unit configured to determine a VSNR based on the measurement. In another embodiment, a first noise calculation circuit is configured to determine first noise information from a video signal and a second noise calculation circuit is configured to determine second noise information from a video signal in a manner different from the first noise calculation circuit. A control unit may be configured to generate a VSNR based on one or both of the first noise information and the second noise information.

20 Claims, 7 Drawing Sheets

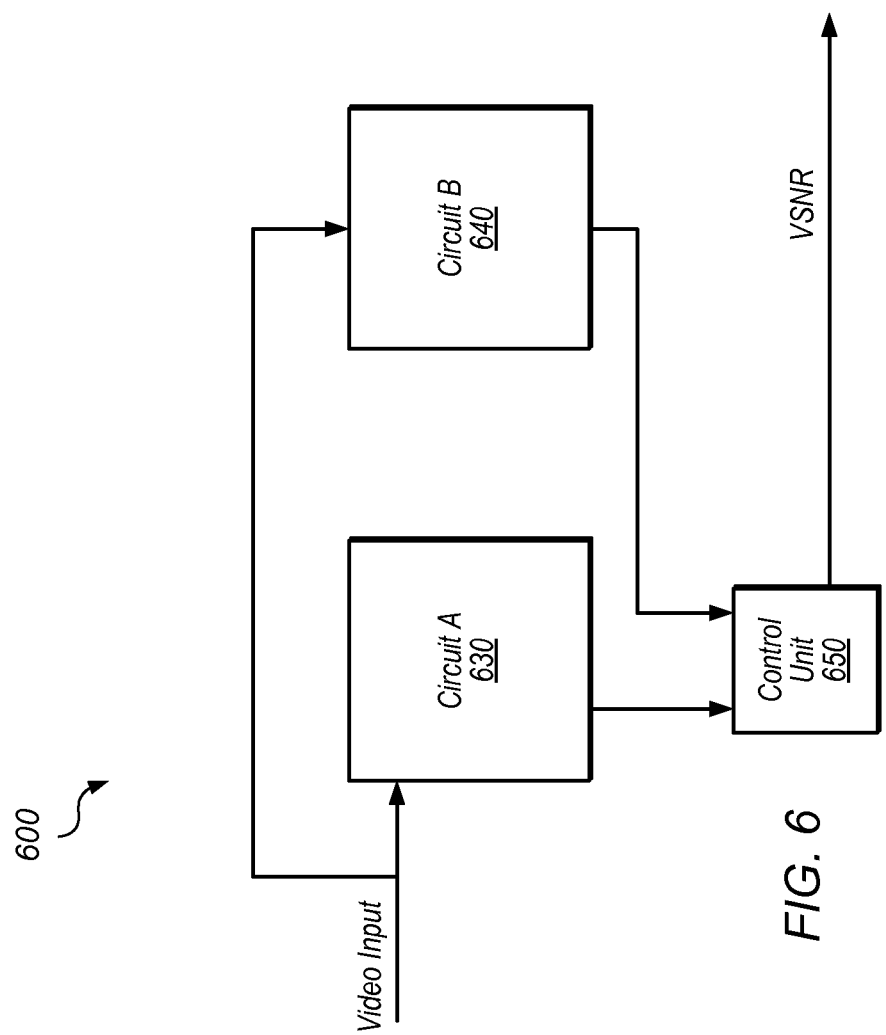

APPARATUS FOR MEASURING NOISE IN AN ANALOG SIGNAL

This application claims the benefit of U.S. Provisional Application No. 61/663,491, filed on Jun. 22, 2012, which is incorporated by reference herein in its entirety.

BACKGROUND

1. Technical Field

This disclosure relates generally to analog television signal receivers, and, more specifically, to measuring video signal-to-noise ratio in analog television signals.

2. Description of the Related Art

Analog television (TV) signal receivers are generally configured to down-convert conventional radio frequency (RF) analog television signals to an intermediate frequency, and, in some cases, further demodulate to a baseband video signal. In this context, variations in video signal-to-noise ratio (VSNR) may cause artifacts and distortions in displayed video. Thus, it is generally desirable to maintain a consistent VSNR in the presence of RF blockers. In other words, rather than attempting to provide a highest attainable VSNR which may vary over time it is often better to provide a lower, consistent VSNR. In addition, some standards (CENELEC 55020, for example) define limits on VSNR degradation in the presence of RF blockers. Therefore, it may be desirable to suppress VSNR to a level that can be consistently maintained.

For example, when a TV receiver is receiving video data from a particular channel, signals from nearby TV channels or signals from other electronic devices (both examples of RF blockers) may cause VSNR variations. To solve this problem, an automatic gain control system in a receiver may vary an RF gain based on VSNR so as to optimize the noise performance of the receiver while preventing compression of the combined received desired signal and blocker in the receiver RF circuitry. To do so, a receiver may need to obtain the VSNR of the received video signal. TV receivers may also use VSNR data for other purposes.

SUMMARY OF EMBODIMENTS

The present disclosure describes techniques for improved measuring of signal-to-noise ratios in analog signals.

In one embodiment, a method includes measuring noise, by a measurement circuit, in a video signal during an interval of the video signal that corresponds to a horizontal control signal and determining a video signal-to-noise ratio of the video signal based on the measurement. In some embodiments, the horizontal control signal indicates an end of a line of video data and is a horizontal sync signal. In some embodiments the method further includes detecting the horizontal sync signal and a delay between the detection and the measurement may be user-programmable.

In another embodiment, an analog television signal receiver includes a first noise calculation circuit configured to determine first noise information from a video signal, a second noise calculation circuit configured to determine, in a manner different from the first noise calculation circuit, second noise information from the video signal and a control unit configured to generate a video signal-to-noise ratio (VSNR) for the video signal based on one or both of the first noise information and the second noise information. In some embodiments, the first noise calculation circuit is configured to determine first noise information during one or more vertical sync signals of the video signal and the second noise calculation circuit is configured to determine second noise information by determining noise during one or more horizontal sync signals of the video signal.

In yet another embodiment, an analog television signal receiver includes a measurement unit configured to measure noise in a video signal over one or more intervals that correspond to one or more horizontal control signals of the video signal and a control unit configured to determine a video signal-to-noise ratio of the video signal based on the measurement. In some embodiments the measurement unit comprises a high-pass filter, a squaring circuit, and an accumulator. In some embodiments the analog television signal receiver further comprises a detector circuit for detecting the one or more horizontal control signals of the video signal.

BRIEF DESCRIPTION OF THE DRAWINGS

FIG. 6 is a block diagram illustrating one embodiment of an analog television signal receiver including two different circuits for measuring noise in a video signal.

This specification includes references to "one embodiment," "the illustrated embodiment," "in some embodiments," and "in various embodiments." The appearances of these phrases do not necessarily refer to the same embodiment. Particular features, structures, or characteristics may be combined in any suitable manner consistent with this disclosure.

DETAILED DESCRIPTION

A video signal-to-noise ratio (VSNR) may be obtained by measuring noise in a flat, stable signal over a measuring interval, and then calculating VSNR based on the measured noise, some measurable amplitude of the signal, and the duration of the measuring interval.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Figure 1:
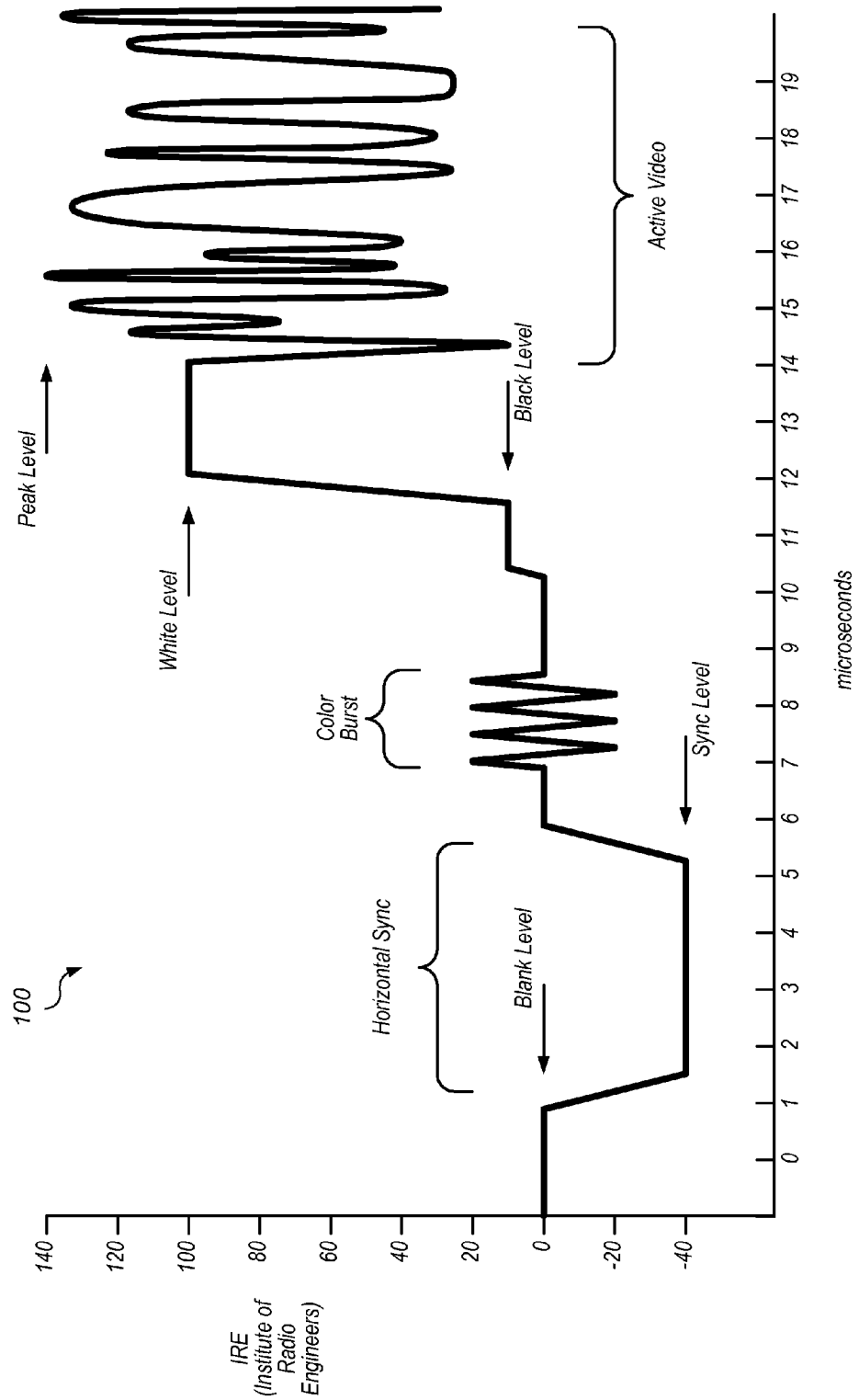
FIG. 1 is a diagram illustrating characteristics of an exemplary baseband analog video signal.

An example portion of a composite video signal 100 is shown in FIG. 1. Composite video signals include both luminance and chrominance components as well as synchronization signals. The scale in units of IRE on the left-hand side of FIG. 1 corresponds to the voltage level of a signal in relative units ranging from blank (0 IRE) to white (100 IRE). The amplitude of composite video signals may vary, thus the relative measurement standard. FIG. 1 shows various video levels including sync (−40 IRE), blank (0 IRE), black (7.5 IRE), white (100 IRE), and peak (140 IRE) levels. The black and/or blank levels may be used to represent blackest portions of video while white and/or peak levels may be used to represent whitest portions of video. In some composite formats, the black and blank levels may be equal, e.g., both at 0 IRE and/or the white and peak levels may be equal, e.g., both at 100 IRE. The signal 100 of FIG. 1 includes a "color burst" portion that may be used to synchronize a video color demodulator with a chrominance carrier. The "horizontal sync" signal may be used to indicate the end of a horizontal line of video. Composite video signals also include vertical sync signals (not shown) that indicate the bottom of a screen of video. The "active video" portion includes both luminance and chrominance information for part of a horizontal line of a frame of video.

An ideal noise measurement typically occurs over a relatively long, stable interval of a flat "gray" test signal, e.g., at 50 IRE with no color. However, as demonstrated by the composite video signal 100 of FIG. 1, most video signals cannot be relied upon to include such an ideal interval.

Figure 2B:
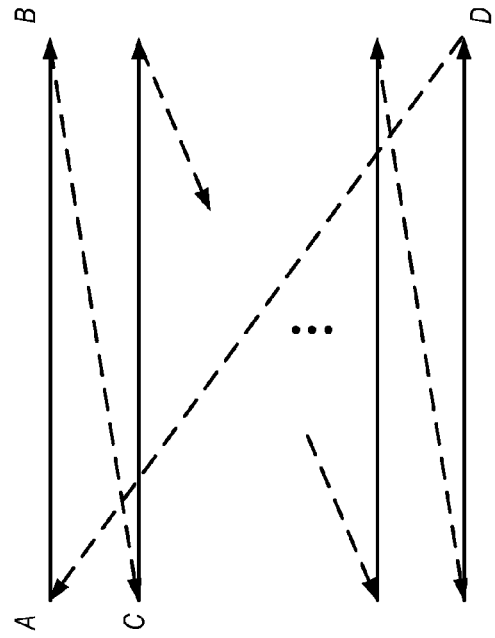
FIG. 2b is a diagram illustrating scanning of video information for a television screen.
Figure 2A:
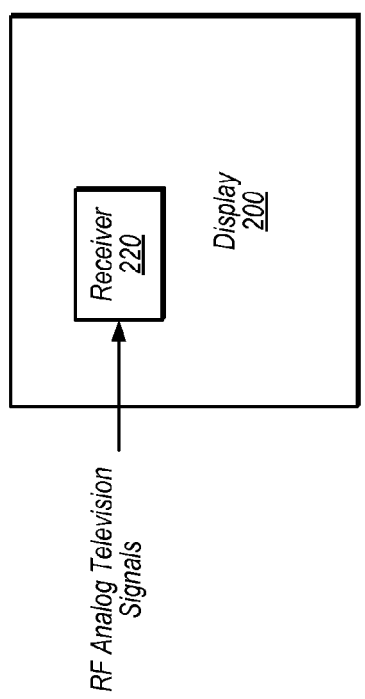
FIG. 2a is a block diagram illustrating one embodiment of a display and a receiver.

Referring to FIG. 2a, a block diagram of a display 200 including a receiver 220 is depicted. Receiver 220 may receive RF analog television signals, which may arrive from broadcast or terrestrial sources, through a wire or cable, from a satellite, etc. One example of an analog video signal is a composite video signal modulated on an RF carrier, which may make up part of an RF analog television signal. Receiver 220 is configured to receive the RF analog television signals in order to display video—in this embodiment on display 200. In various embodiments, receiver 220 may be located within display 200 or elsewhere, e.g., as a stand-alone module. Display 200 may be a television.

In the present disclosure, various units, circuits, or other components may be described or claimed as "configured to" perform a task or tasks. In such contexts, "configured to" is used to connote structure by indicating that the units/circuits/components include structure (e.g., circuitry) that performs the task or tasks during operation. The unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

Receiver 220 may be configured to measure noise in a received video signal in order to calculate the VSNR of the signal. Receiver 220 may alter operation of one or more receiver elements in order to maintain a steady VSNR over some desirable range. As described below, in various embodiments, receiver 220 may measure noise during portions of various control signals of a video signal. In some embodiments, receiver 220 may measure noise during (relatively) flat portions of synchronization ("sync") signals of the video signal.

Turning now to FIG. 2b, a scan pattern for an analog video signal is depicted. Analog video signals typically convey information corresponding to one horizontal line of a TV screen at a time. A TV typically receives line information left-to-right and receives lines from top-to-bottom. In some embodiments, lines may be scanned or updated every other line in an interlaced manner. Video signals typically include vertical and horizontal control signals such as synchronization ("sync") signals. Horizontal sync ("hsync") signals indicate the end of a horizontal line on a TV screen and that the next line of information corresponds to a lower line. Vertical sync ("vsync") signals indicate that the bottom of the TV screen has been reached and that next line of video information corresponds to a line at the top of the screen. For example, the video signal of FIG. 2b includes information corresponding to a line of video from point A to point B. Then a horizontal sync in the signal indicates that the next line of video information corresponds to the line starting at point C, etc. When point D is reached, a vertical sync in the video signal indicates that scanning should begin back at point A. Note that some TV's may not actually display some video lines and/or columns near the edges of a screen. Both horizontal sync and vertical sync signals in video signals may include flat, relatively stable portions that may be used in some embodiments of the present disclosure to measure noise in the analog video signal.

Figure 3:
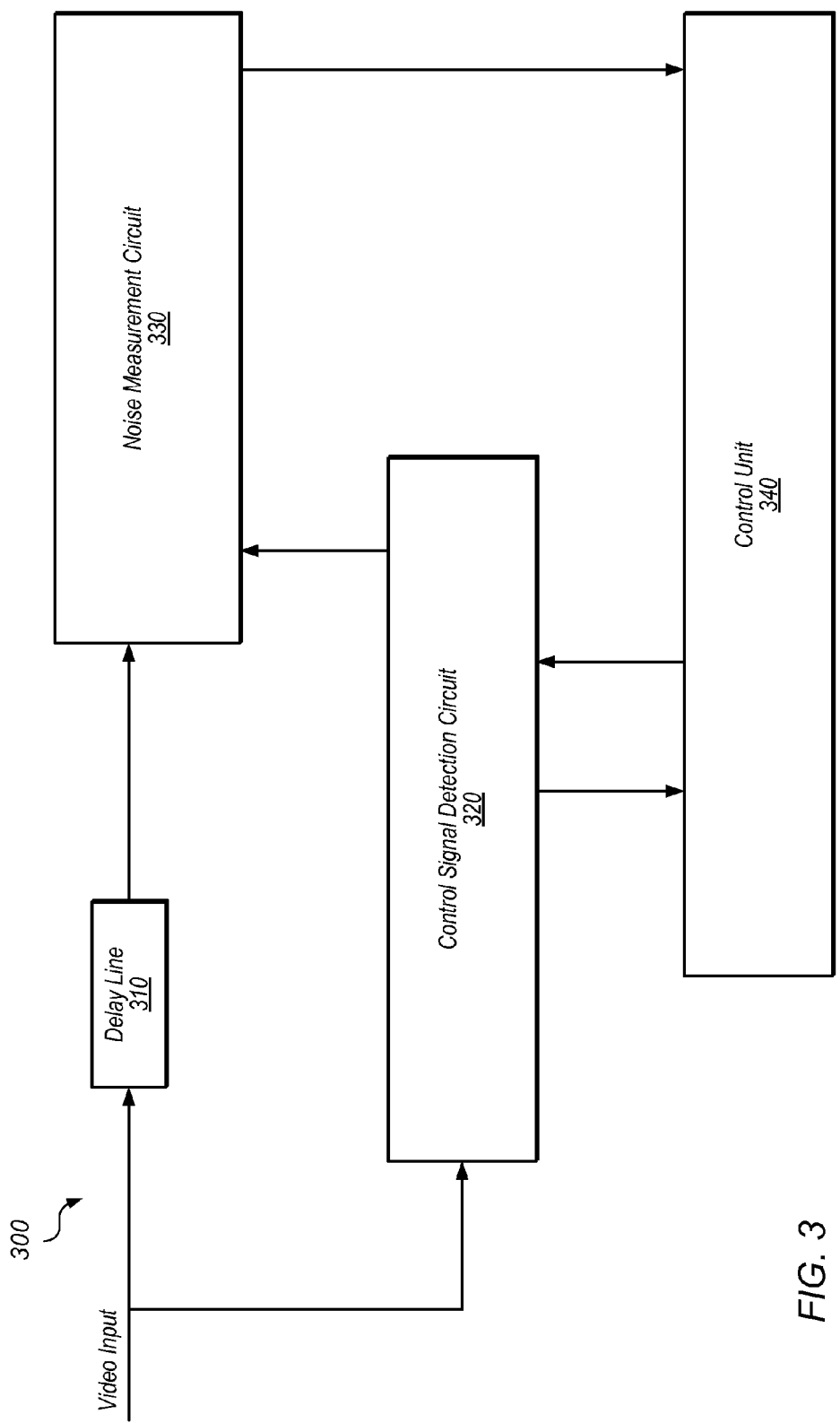
FIG. 3 is a block diagram illustrating one embodiment of a circuit that measures noise in a video signal.

Turning now to FIG. 3, a block diagram of an exemplary circuit 300 for measuring noise in a video signal is depicted. The circuit 300 includes delay line 310, control signal detection circuit 320, noise measurement circuit 330, and control circuit 340. Control signal detection circuit 320 may be configured to detect control signals in the video input signal. Delay line 310 may be configured to delay the video input before sending it to the noise measurement circuit 330 in order to compensate for the time required by the control signal detection circuit to detect a control signal. Noise measurement circuit 330 may be configured to measure noise in control signals. Control unit 340 may be configured to send and receive information and parameters from control signal detection circuit 320 and to store and process noise data from noise measurement circuit 330.

In one embodiment, control signal detection circuit 320 may be configured to detect horizontal control signals such as horizontal sync signals. For example, control signal detection circuit 320 may detect that the video input falls to a sync level as shown in FIG. 1. After detecting a horizontal sync signal, control signal detection circuit 320 may be configured to activate noise measurement circuit 330 and noise measurement circuit 330 may be configured to measure noise during at least a portion of a horizontal sync signal. In some embodiments, the circuit 300 of FIG. 3 may similarly be used to detect vertical sync signals.

In some instances, because of the nature of horizontal sync signals, it may be easier to measure noise in vertical sync signals. For example, in some cases, each horizontal sync signal may last about 4.7 microseconds, while a vertical sync signal may last about 27.3 microseconds. Because of the shorter nature of horizontal sync, it may be more difficult to find a flat interval within a horizontal sync signal where the signal has settled to a relatively stable level such that noise can be accurately measured.

However, vertical sync signals may not be available for measuring noise in all video signals. For example, some equipment may use vertical sync signals to transmit additional information, may use vertical sync signals with unexpected characteristics, or may not include vertical sync signals at all. For example, certain video signals in hotel television systems and video signals recorded by certain VCR's may exhibit such irregularities. Further, many horizontal sync signals occur for each vertical sync signal (e.g., there may be several hundred horizontal lines on a TV screen and thus several hundred horizontal sync signals for each vertical sync signal). Therefore, measuring noise over multiple horizontal sync signals may allow for noise measurement over longer intervals of a video signal compared to measuring noise in vertical sync signals. Thus, in some situations, it may be desirable to measure noise in both vertical sync and horizontal sync signals or to measure noise only in horizontal sync signals.

Figure 4:
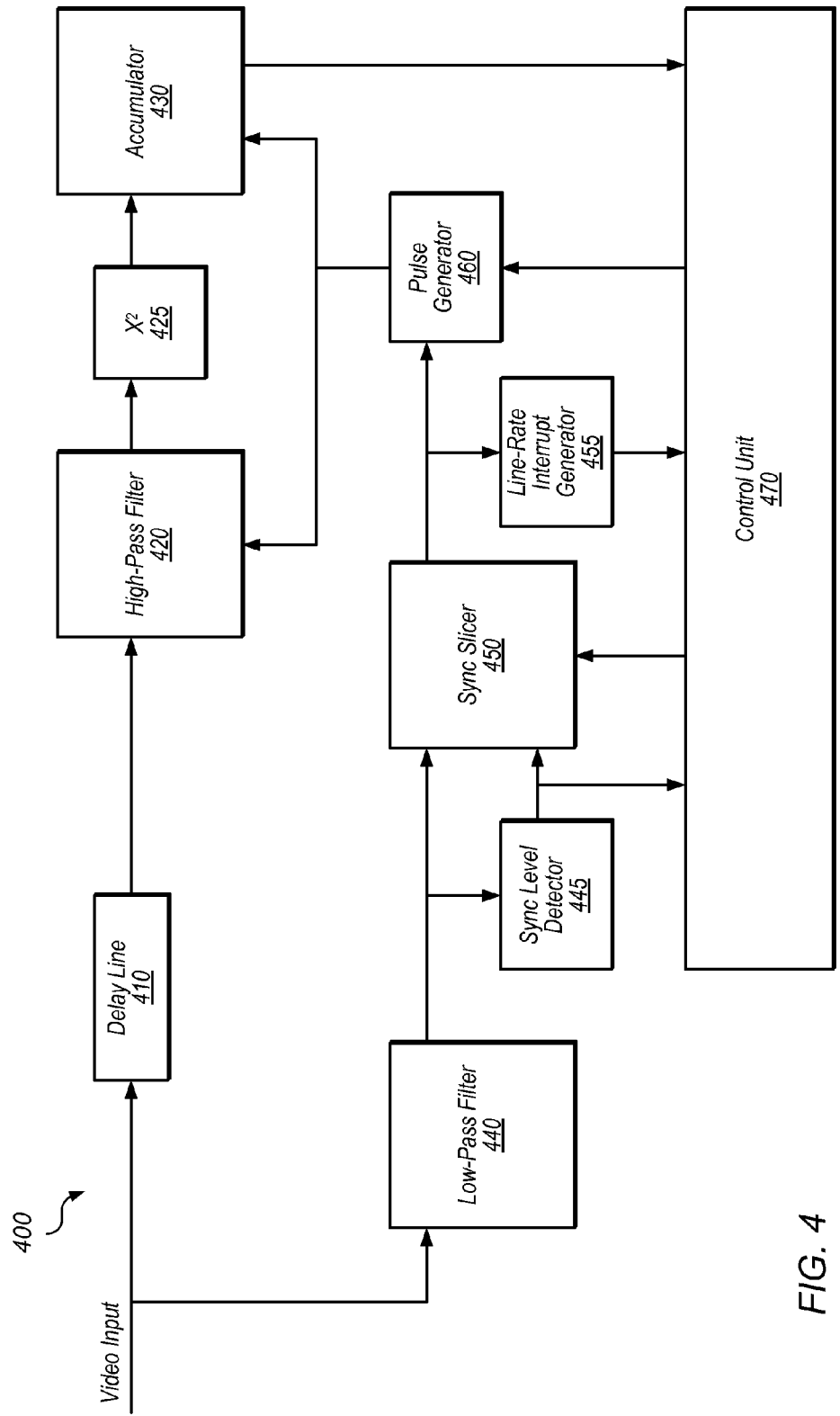
FIG. 4 is a block diagram illustrating a more detailed embodiment of a circuit that measures noise in a video signal.

Turning now to FIG. 4, a block diagram of a more detailed exemplary circuit 400 for measuring noise in a video signal is depicted. The circuit 400 includes delay line 410, high-pass filter 420, squaring element 425, accumulator 430, low-pass filter 440, sync level detector 445, sync slicer 450, line-rate interrupt generator 455, pulse generator 460 and control unit 470. In the illustrated embodiment, elements 440-470 are generally configured to detect sync signals in a video signal and appropriately activate high-pass filter 420 and accumulator 430. In this embodiment, elements 420-430 are generally configured to measure and accumulate noise during at least a part of one or more detected sync signals. Control unit 470 may be configured to monitor and control various elements of FIG. 4 and may perform VSNR calculations.

Video input arrives at low-pass filter 440. In one embodiment, video input is a demodulated composite video signal (i.e., a composite signal that has been demodulated from an RF carrier). Low-pass filter 440 may be configured to pass the low frequency luminance component of the video input and reject the chrominance component and any other high frequency components. The output of low-pass filter 440 is coupled to sync level detector 445 and sync slicer 450.

Sync level detector 445 may be configured to capture the magnitude of a sync signal of the signal from low-pass filter 440 in order to establish a reference level. In some embodiments, sync level detector 445 may establish a reference level based on a plurality of captured magnitudes of sync signals of the video input. In some embodiments, the reference level may correspond to the signal amplitude used to calculate VSNR. In other embodiments, the amplitude used to calculate the VSNR may not correspond to a sync reference level and may be measured by another element of a receiver.

Sync slicer 450 may be configured to generate a binary timing signal when a sync signal is detected. For example, sync slicer 450 may generate a pulse corresponding to the duration of a detected sync signal. Detection of a sync signal may be based on the reference level from sync level detector 445. For example, the sync slicer 450 may generate a timing signal when a sync signal reaches half of the reference level from sync level detector 445. In another embodiment, sync slicer 450 may internally generate a reference level. In various embodiments, the sync slicer 450 may reject pulses outside of expected sync intervals.

Line-rate interrupt generator 455 receives the output of sync slicer 450 and may be configured to produce interrupts to control unit 470. In some embodiments these interrupts are predictive, e.g., based on the period of detected sync signals. Control unit 170 may control elements of circuit 400 based on such interrupts.

Pulse generator 460 may be configured to generate a pulse based on the received binary output of sync slicer 450 and information from control unit 470. The pulse may be generated during a portion of the time the signal from sync slicer 450 is active. Said another way, the signal from sync slicer 450 may correspond to the width of a sync signal and the pulse from pulse generator 460 may correspond to a shorter interval within the sync signal. The generated pulse may be sent to high-pass filter 420 and accumulator 430 to control the interval over which noise is measured and accumulated.

Delay line 410 may be configured to delay the video input before sending it to high-pass filter 420 in order to compensate for the time required to detect the sync signal as described above. This delay may allow the pulse signal from pulse generator 460 to arrive at high-pass filter 420 correctly aligned with a detected sync signal.

High-pass filter 420 may be configured to pass high frequency components (which include noise) and reject lower frequency components and DC signals. High-pass filter 420 may be re-initialized at each occurrence of the sync signal in a video signal and may be activated by the pulse from pulse generator 460. Squaring element 425 may be configured to receive the output of high-pass filter 420 and square it. Squaring element 425 may be a hardware multiplier in some embodiments, or any appropriate element configured to square a signal.

Accumulator 430 may be configured to receive the output from squaring element 425 and accumulate it over the interval of the pulse width from pulse generator 460 to generate a noise power measurement. This accumulation may involve storing a number of samples of noise power from squaring element 425. The output of accumulator 430 is sent to control unit 470.

Control unit 470 is configured to receive input from sync level detector 445 and line-rate interrupt generator 455, as well as accumulator 430. Control unit 470 may be configured to control sync slicer 450 using programmable parameters such as modes, resets, initializations, filter time constants, etc. These parameters may be based on the reference level from sync level detector 445 and may allow the sync slicer to determine what constitutes a valid sync signal. Control unit 470 may also control the pulse delay and pulse width of pulse generator 460. Various parameters of control unit 470 may be programmable by a distributor or user. Such parameters include at least the pulse delay and pulse width of pulse generator 460 as well as other parameters used to control sync slicer 450 and pulse generator 460.

Controlling characteristics of the pulse of pulse generator 460 may allow circuit 400 to measure noise in appropriate parts of a sync signal. For example, since horizontal sync signals are relatively short, it may be desirable to delay the pulse until the sync signal has settled to a stable sync level, i.e. after transients have settled. Similarly, it may be desirable to configure the duration of the pulse depending on the characteristics of received horizontal sync signals. Note that various types of sync signals may have various sync levels, which may or may not correspond to the sync level of FIG. 1. In various embodiments, the ability to program pulse parameters may allow for more accurate VSNR measurements in various signals with different sync signal characteristics.

Control unit 470 may generate a VSNR based on noise power data from accumulator 430. In some embodiments, control unit 470 collects and processes data from accumulator 430 corresponding to multiple sync signals in order to calculate a noise power estimate. In one embodiment, control unit 470 may calculate a VSNR as a ratio of the reference level from sync level detector 445 to the noise power. In other embodiments, control unit 470 may calculate a VSNR as a ratio of some other measured signal amplitude to the noise power as discussed above with reference to FIG. 3. In other embodiments, control unit 470 may not generate a VNSR, but may send noise information to another element of circuit 400 and some other element may generate a VSNR based on the noise information. In one embodiment, control unit 470 may be a microcontroller. In other embodiments, control unit 470 may be a processor, a field-programmable gate array (FPGA) or any other processing element configured to perform the functionality described above.

Various embodiments of circuit 400 may allow measurement of noise for VSNR calculations during relatively short control signals such as horizontal sync signals. In addition, the programmability of elements in some embodiments of circuit 400 may allow a user to program circuit 400 in order to accurately measure VSNR in received video signals with control signals having varying characteristics.

Figure 5A:
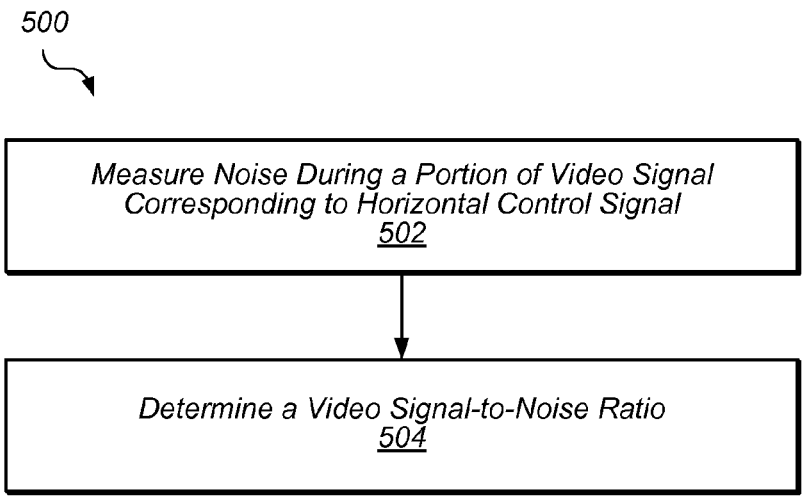
FIGS. 5a and 5b are flow diagrams illustrating embodiments of methods for measuring noise during sync signals in a video signal.

Turning now to FIG. 5a, a flow diagram illustrates one embodiment of a method 500 for measuring noise during a sync signal. Flow begins at block 502.

At block 502, noise is measured during a portion of a video signal corresponding to a horizontal control signal in the video signal. In one embodiment, this measuring is performed by high-pass filter 420, squaring element 425, and accumulator 430 of FIG. 4. In one embodiment the horizontal control signal is a horizontal sync signal. Flow proceeds to block 504.

At block 504, a video signal-to-noise ratio is determined based on the measuring of block 502. In one embodiment, a control unit such as control unit 470 of FIG. 4 performs this determining.

Figure 5B:
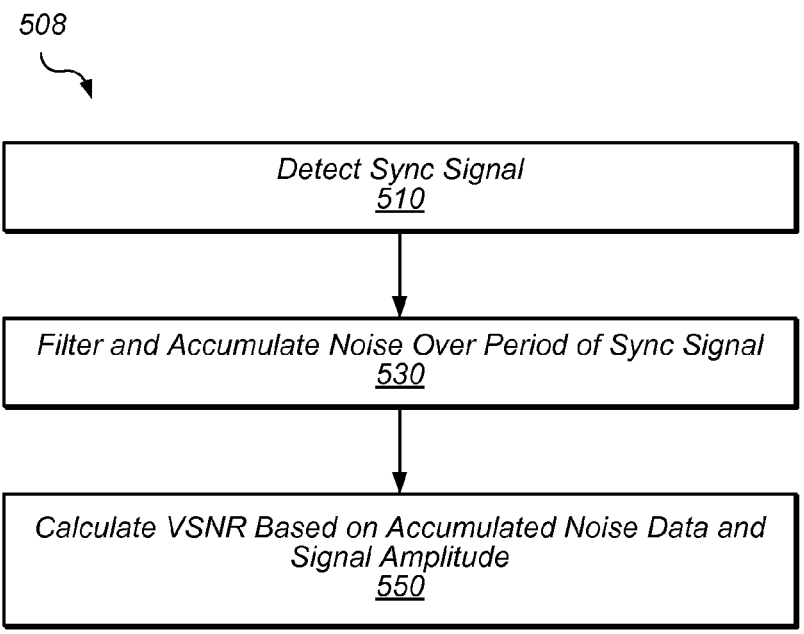

Turning now to FIG. 5b, a more detailed flow diagram illustrates one embodiment of a method 508 for measuring noise during a sync signal. Flow begins at block 510.

At block 510, a sync signal is detected in a received video signal. In some embodiments, the sync signal may be a vertical sync or horizontal sync. In some embodiments, sync slicer 450 and/or sync level detector 445 may detect the sync signal. Flow proceeds to block 530.

At block 530, noise is filtered and accumulated over an interval of the sync signal. The accumulating may include storing multiple samples of noise data over the interval. The filtering may be implemented in some embodiments by a high-pass filter to pass noise components of the signal but reject DC components. Additionally, filter output may be squared in some embodiments in order to eventually calculate an averaged noise power measurement. For example, elements 420-430 of FIG. 4 may perform the filtering and accumulating. Flow proceeds to block 550.

At block 550, a VSNR is calculated based on the accumulated noise data from block 530, the duration the accumulation interval, and an amplitude of the signal. In one embodiment, control unit 470 calculates the VSNR. For example, one equation for calculating VSNR in decibels is:

$$VSNR(dB) = 20 \cdot \log_{10}(\text{signal\_amplitude}) - 10 \cdot \log_{10}(\text{noise\_power}/N)$$

Where signal_amplitude corresponds to an amplitude of the video signal, noise_power may correspond to the accumulated noise power from block 530, and N may correspond to a number of samples over which noise power was accumulated. For example, noise_power/N may correspond to an average noise power over the accumulation interval. In various embodiments, signal_amplitude may correspond to a difference between a blank level and a white level in a received video signal. In other embodiments, signal_amplitude may correspond to other amplitudes, such as a difference between a peak level and a black level, a difference between a blank level and a sync level (which may correspond to the amplitude of sync signals), etc. Such video levels are described above with reference to FIG. 1. In some embodiments, such measurements may be used to approximate a peak-to-peak amplitude of video data in a video signal. Signal_amplitude may be directly measured by a receiver or approximated using various techniques. In one embodiment, sync level detector may measure a signal and generate a signal_amplitude. In another embodiment, another element (not shown) may measure and/or generate signal_amplitude. Similarly, the above equation for VSNR may be implemented directly, or a receiver may implement a different VSNR equation or some approximation thereof in hardware, firmware, and/or software. In general, VSNR may be calculated as a ratio of some reference amplitude and the measured noise. In some embodiments, the steps of block 510 and 530 may be performed for multiple sync signals, and the resulting noise information may be combined before calculating a VSNR. Flow ends at block 550.

Turning now to FIG. 6, an analog television signal receiver 600 including two circuits for measuring noise is depicted. Receiver 600 includes circuit A 630, circuit B 640, and control unit 650. Circuit A 630 and circuit B 640 may be configured to measure noise differently. For example, circuit A 630 and circuit B 640 may measure noise in a video signal at different times or circuit A 630 and circuit B 640 may measure noise in a video signal using different methodologies and/or different hardware elements. In some embodiments, a receiver such as receiver 600 may include more than two circuits for measuring noise. Including multiple circuits for measuring noise may allow receiver 600 to calculate a more accurate VSNR. In addition, including multiple circuits for measuring noise may allow receiver 600 to continue calculating a VSNR when one of the circuits is unable to detect appropriate portions of a received signal for measuring noise (e.g., either because the appropriate portions are not present or do not match expected characteristics). In one embodiment, circuit A 630 and circuit B 640 each correspond to a circuit 400 of FIG. 4. Control unit 650 may be configured to generate a VSNR based on the outputs of circuit A 630 and circuit B 640.

A baseband analog video input is received at circuit A 630 and circuit B. In one embodiment, circuit A may be configured to measure noise in one or more vertical sync signals. In this embodiment, circuit B may be configured to measure noise in one or more horizontal sync signals.

Control unit 650 is coupled to circuit A 630 and circuit B 640. Control unit 650 may be configured to receive information corresponding to noise measurements and/or VSNR calculations from circuit A 630 and circuit B 640 and generate a VSNR based on this information. For example, in one embodiment, control unit 550 is configured to average information from circuit A 630 and circuit B 640 to generate the a VSNR. In another embodiment, control unit 650 is configured to use information from circuit A 630 alone to generate a VSNR during normal operation. However, in this embodiment, if circuit A 630 is unable to detect vertical sync signals, control unit 650 is configured to use information from circuit B to generate a VSNR.

For example, as discussed above, in embodiments where circuit A 630 is configured to measure noise in vertical sync signals of a signal, circuit A 630 may be unable to detect or use vertical sync signals to measure noise in some received signals. Vertical sync signals may be absent from a received signal, may not include expected characteristics for detection, and/or may not include relatively stable, flat portions. In this situation, control unit 650 may determine that information from circuit A 630 is not accurate or not valid. For example, control unit 650 may predict the location in time of vertical sync signals and may detect if circuit A fails to detect a valid vertical sync signal at such locations. Control unit 650 may also detect or calculate a VSNR based on information from circuit A 630 that is outside of a reasonable operating range, indicating the circuit A is unable to accurately measure noise information in vertical sync signals. In this situation, receiver 600 may be able to calculate a VSNR using information from circuit B 630 (e.g., in embodiments where circuit B 630 calculates noise based on horizontal sync signals).

In some embodiments, control unit 650 may dynamically alternate between various methods for generating a VSNR based on the information from circuit A 630 and circuit B 640. For example, control unit 650 may switch among using information from circuit A 630, using information from circuit B 640, and/or using information from both circuit A 630 and circuit B 640 during operation of receiver 600. Circuit A 630 and circuit B 640 may implement various methodologies to measure noise in a video signal, including, but not limited to, those described in this disclosure.

In various embodiments, noise information from circuit A 630 and/or circuit B 640 may correspond to individual sync signals or multiple sync signals of a received signal. Similarly, control unit 650 may generate a VSNR based on noise information corresponding to measurements from individual sync signals or from several sync signals of a received signal. For example, if noise information corresponds to noise measured during horizontal sync signals, it may be desirable to use noise data from multiple horizontal sync signals because each horizontal sync signal is relatively short.

In one embodiment, receiver 600 may be configured to alter its operation based on the VSNR generated by control unit 650. In various embodiments, such alteration may result in a lower, more consistent VSNR in the presence of RF blockers. For example, control unit 650 may calculate a threshold VSNR that can be maintained in the presence of RF blockers and when a measured VSNR passes the threshold VSNR, control unit 650 may be configured to alter the operation of receiver 600 to suppress VSNR.

Figure 7:
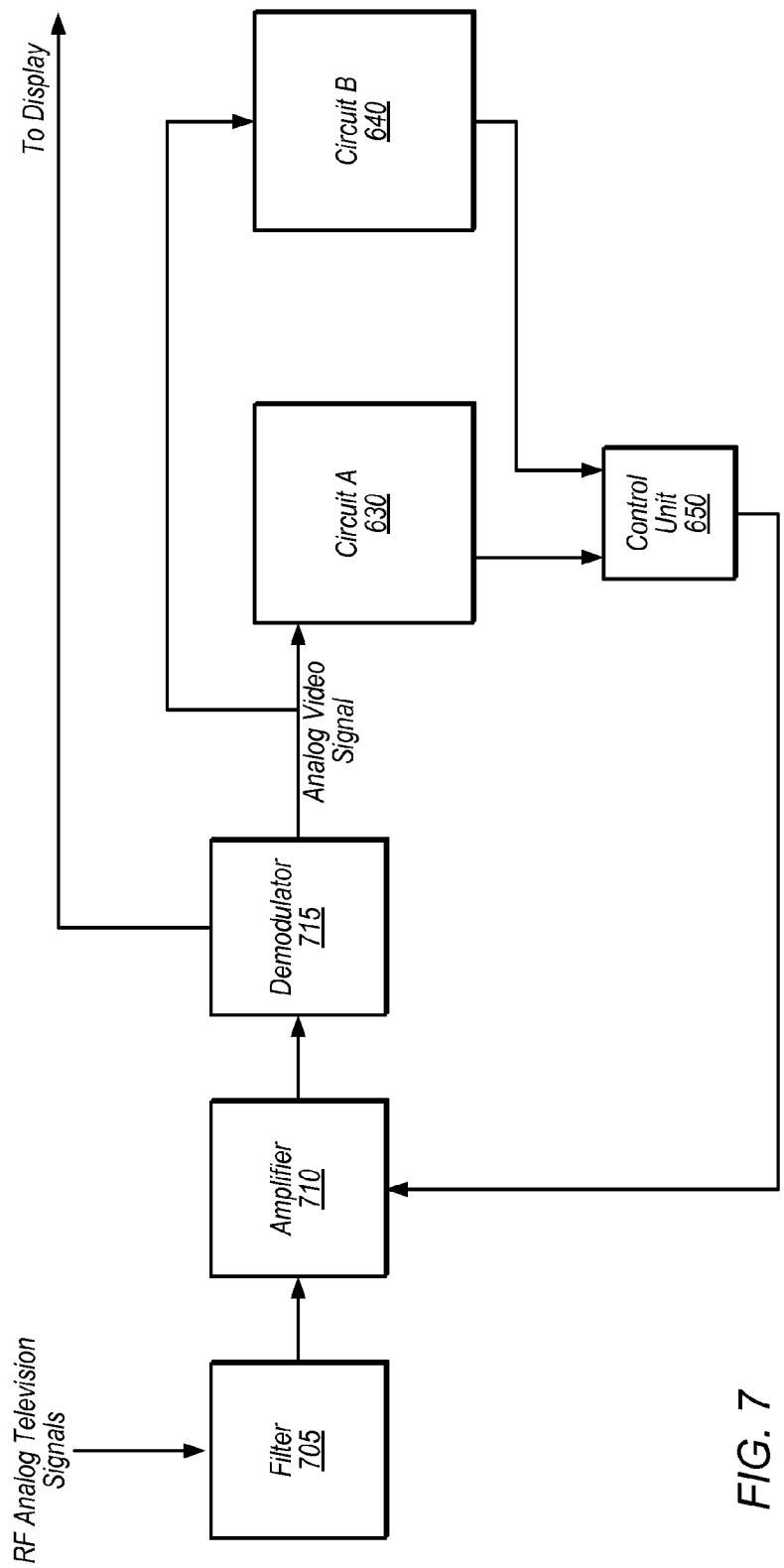
FIG. 7 is a block diagram illustrating one embodiment of an analog television signal receiver including a control unit that controls a gain of an amplifier.

Turning now to FIG. 7, block diagram illustrating one embodiment of an analog television signal receiver 700 is shown. Receiver 700 includes filter 705, which receives RF analog television signals and may filter the signals based on a desired frequency. Amplifier 710 is coupled to filter 705 and may amplify filtered signals. Demodulator 715 may demodulate baseband video information from an RF carrier, and send the resulting analog video signal to circuit A 630 and circuit B 640. Demodulator 715 may additionally send the analog video signal to a display. Circuit A 630 and circuit B 640 may be configured to measure noise as described above with reference to FIG. 6. Control unit 650 may be configured to receive noise information from circuit A 630 and/or circuit B 640 and may calculate a VSNR based on the received noise information as described above with reference to FIG. 6.

In one embodiment, based on a calculated VSNR, control unit 650 may be configured to control a gain of amplifier 710 in order to maintain a consistent VSNR in receiver 700. For example, in the presence of RF blockers, control unit 650 may be configured to lower the gain of amplifier 710 in order to suppress VSNR to a maintainable level. Maintaining a consistent VSNR may prevent artifacts and distortions in displayed video.

In various embodiments of the present disclosure, a receiver is described as receiving RF analog television signals and calculating video signal-to-noise ratio (VSNR). In other embodiments, a receiver may receive various non-video analog signals and calculate signal-to-noise ratios corresponding to those signals. In some embodiments, a receiver may include a plurality of circuits that measure noise in different ways and may generate a VSNR based on information from one or more of the plurality of circuits. In various embodiments, a receiver may include circuits that measure noise in control signals of an analog signal that include relatively stable, flat portions.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   measuring noise, by a first measurement circuit, in a video signal during an interval of the video signal that corresponds to a horizontal control signal;
   measuring noise, by a second measurement circuit, in the video signal during an interval of the video signal the corresponds to a vertical control signal; and
   determining a video signal-to-noise ratio of the video signal based on the measuring performed by the first measurement circuit and the measuring performed by the second measurement circuit.

2. The method of claim 1, wherein the horizontal control signal indicates an end of a line of video data.

3. The method of claim 1, wherein a duration of the measuring by the first measurement circuit is user-programmable.

4. The method of claim 1, wherein the horizontal control signal is a horizontal sync signal, the method further comprising detecting, by a sync detector circuit, the horizontal sync signal, wherein the detecting comprises capturing an amplitude associated with the horizontal sync signal.

5. The method of claim 4,
   wherein said measuring by the first measurement circuit is based on said detecting;
   wherein said measuring by the first measurement circuit further comprises:
      filtering noise in the video signal; and
      accumulating the result of said filtering during the interval; and
   wherein said determining is further based on the amplitude and a duration of the interval.

6. The method of claim 4, wherein a delay between said detecting and said measuring by the first measuring circuit is user-programmable.

7. The method of claim 3, further comprising: determining the video signal-to-noise ratio based on the measuring by the first measurement circuit and not the second measurement circuit in response to determining that noise information measured by the second measurement circuit is invalid.

8. An analog television signal receiver, comprising:
   a first noise calculation circuit configured to determine first noise information during a first type of control signal in a video signal;
   a second noise calculation circuit configured to determine second noise information during a second, different type of control signal in the video signal; and a control unit configured to generate a video signal-to-noise ratio (VSNR) for the video signal based on one or both of the first noise information and the second noise information.

9. The analog television signal receiver of claim 8, wherein the first type of control signal is a vertical sync signal and wherein the second, different type of control signal is a horizontal sync signal.

10. The analog television signal receiver of claim 8, wherein the second noise calculation circuit is configured to determine the second noise information over an interval that is user-programmable.

11. The analog television signal receiver of claim 8, wherein the control unit is configured to generate the VSNR based on the second noise information but not the first noise information in response to an indication that the first noise information is not accurate.

12. The analog television signal receiver of claim 8, wherein the control unit is configured to generate the VSNR based on an average of the first noise information and the second noise information.

13. The analog television signal receiver of claim 8, wherein the control unit is further configured to alter an operation of the analog television signal receiver based on the VSNR.

14. An analog television signal receiver, comprising:
a measurement unit configured to measure noise in a video signal over one or more intervals that correspond to one or more horizontal control signals of the video signal; and
a control unit configured to determine a video signal-to-noise ratio of the video signal based on said measuring;
wherein the control unit is configured to assert a user-programmable delay between detection of the one or more horizontal control signals and the measurement unit beginning to measure noise over one of the one or more intervals.

15. The analog television signal receiver of claim 14, wherein the measurement unit comprises:
a high-pass filter configured to pass noise components of the video signal;
a squaring circuit, configured to square the output of the high-pass filter; and
an accumulator configured to accumulate the output of the squaring circuit.

16. The analog television signal receiver of claim 15, further comprising a detector circuit configured to detect the one or more horizontal control signals of the video signal.

17. The analog television signal receiver of claim 16,
wherein the detector circuit is configured to activate the high-pass filter and the accumulator at the end of the user-configurable delay.

18. The analog television signal receiver of claim 14, wherein the control unit is further configured to control a start time and a duration of at least one of the one or more intervals over which the measurement unit is configured to measure noise, wherein the start time and duration are based on user input.

19. The analog television signal receiver of claim 14, wherein a duration of one of the one or more intervals is user-programmable.

20. The analog television signal receiver of claim 14, further comprising an amplifier, wherein the control unit is configured to modify a gain of the amplifier based on the determined video signal-to-noise ratio.

\* \* \* \* \*